United States Patent
Park (10) Patent No.: US 12,369,609 B2
(45) Date of Patent: Jul. 29, 2025

(54) METHOD FOR MANUFACTURING LAVER-SHAPED PROCESSED FOOD USING ALLIUM CEPA L

(71) Applicants: Dae-Long Park, Taebaek-si (KR); Younhee Park, Manassas Park, VA (US)

(72) Inventor: Dae-Long Park, Taebaek-si (KR)

(73) Assignees: Dae-Long Park, Taebaek-si (KR); Younhee Park, Manassas Park, VA (US)

( * ) Notice: Subject to any disclaimer, the term of this patent is extended or adjusted under 35 U.S.C. 154(b) by 0 days.

(21) Appl. No.: 18/932,711

(22) Filed: Oct. 31, 2024

(65) Prior Publication Data
US 2025/0049085 A1    Feb. 13, 2025

Related U.S. Application Data

(63) Continuation of application No. PCT/KR2023/004329, filed on Mar. 30, 2023.

(30) Foreign Application Priority Data

Jul. 29, 2022   (KR) .................. 10-2022-0094990

(51) Int. Cl.
| | | |
|---|---|---|
| A23L 19/00 | (2016.01) | |
| A23B 7/01 | (2006.01) | |
| A23B 7/02 | (2006.01) | |
| A23B 7/045 | (2006.01) | |
| A23L 5/30 | (2016.01) | |

(52) U.S. Cl.
CPC .............. *A23L 19/09* (2016.08); *A23B 7/01* (2013.01); *A23B 7/02* (2013.01); *A23B 7/045* (2013.01); *A23L 5/36* (2016.08)

(58) Field of Classification Search
CPC ... A23L 19/09; A23L 5/36; A23B 7/01; A23B 7/02; A23B 7/045
USPC ............................................... 426/242
See application file for complete search history.

(56) References Cited

FOREIGN PATENT DOCUMENTS

| | | |
|---|---|---|
| KR | 10-2001-0075745 A | 8/2001 |
| KR | 10-2007-0095574 A | 10/2007 |
| KR | 10-2011-0092497 A | 8/2011 |
| KR | 10-2012-0053468 A | 5/2012 |
| KR | 10-1423263 B1 | 8/2014 |
| KR | 10-1862786 B1 | 5/2018 |
| KR | 10-2019-0055564 A | 5/2019 |

OTHER PUBLICATIONS

International Search Report for PCT/KR2023/004329 mailed Aug. 17, 2023 from Korean Intellectual Property Office.

*Primary Examiner* — Subbalakshmi Prakash
(74) *Attorney, Agent, or Firm* — Revolution IP, PLLC (57) ABSTRACT

The present invention relates to a method of manufacturing a laver-like processed food using onions (*Allium cepa* L.), and more specifically, to a method of manufacturing a laver-like processed food using onions that has excellent texture and an improved flavor, wherein, according to the method of the present invention, after onions are molded into sheets and dried, the onion sheets are prevented from sticking to a laver mat for drying and being damaged when the onion sheets are separated from the laver mat, and in this way, a laver-like processed food that is thin and springy can be mass-produced without wasting raw ingredients.

7 Claims, 5 Drawing Sheets

METHOD FOR MANUFACTURING LAVER-SHAPED PROCESSED FOOD USING ALLIUM CEPA L

CROSS REFERENCE TO PRIOR APPLICATIONS

This application is a continuation of international application PCT/KR2023/004329 filed on Mar. 30, 2023 which claims priority to Korean Patent Application No. 10-2022-0094990 filed on Jul. 29, 2022. The entire contents of each of the above-identified applications are hereby incorporated by reference.

BACKGROUND

The present invention relates to a method of manufacturing a laver-like processed food using onions (*Allium cepa* L.), and more specifically, to a method of manufacturing a laver-like processed food using onions that has excellent texture and an improved flavor.

Onions (*Allium cepa* L.) are one of the most widely cultivated vegetables around the world with a unique taste and aroma, and are used as a major flavoring seasoning during food preparation and processing. Onions are a representative crop that forms bulbs among liliaceous crops, and one process of growth, development, flowering, and fruiting of onions takes about two years. Depending on changes in cultivation type or growth and development processes, the process may be completed within one year. However, when normal steps are taken, the seed germinates, vegetative growth is completed, the bulb grows to a certain extent, a new growth point is generated within the bulb, flower buds differentiate at the growth point, and a flower stalk develops.

Onions contain quercetin-related substances, organic sulfuric compounds, and the like and thus help dissolve and eliminate unnecessary fat and cholesterol in the blood to prevent arteriosclerosis and hyperlipidemia, prevent the formation of blood clots that block blood vessels, and break down and eliminate blood clots, thereby preventing and treating circulatory disorders. Also, onions lower the viscosity of blood by diluting the blood (fibrinolytic activity and lipid-lowering activity), making the blood non-sticky, fluid, clear, and clean. In addition, onions can treat diabetes by lowering blood sugar levels and promoting secretion of insulin and have an effect of lowering blood pressure, thus being useful for patients with high blood pressure. Onions mainly contain quercetin glycosides such as quercetin 3-O-glucoside, quercetin 3,4'-diglucoside, and quercetin 4'-glucoside as main components, and contain various allyl sulfide compounds such as propyl allyldisulfide which give them their spicy taste.

Meanwhile, nowadays, due to the domestic overproduction of onions and the plummeting price of onions due to large-scale imports of foreign onions, large amounts of onions are being discarded from the fields of producing areas every year. Excessive government budget consumption for addressing this issue and reduction of farmers' incomes are emerging as problems as a result of this. Accordingly, as a way to promote the consumption of onions, there is an urgent need to develop secondary processed foods that are easy to consume and create high added value while using onions as the main ingredient.

Onions have excellent health benefits but have disadvantages in that they are difficult to consume and difficult to process due to their characteristic spicy taste and smell. Specifically, looking at the recent domestic onion consumption status, 96% is consumed as raw, unprocessed onion for home use (including restaurants), and only about 4% is consumed in processing. As foods produced by processing onions, many processed products such as dried onion powder, onion crackers, onion rings, onion red pepper paste, onion noodles, onion juice, fermented onion beverage, onion-added jam, onion-powder bread, and onion drinks have been developed. However, the amount of onions consumed as seasoning ingredients or additives is limited, and in the case of fermented onion beverage, the pungent smell of onions is expressed more strongly in a distilled beverage, and processing and production are minimal due to consumers' avoidance. The utilization of onions is relatively small compared to green onions and garlic, and despite research and development to date, diverse consumer preferences are not met.

Against this background, the present inventors have attempted to manufacture a laver-like processed food using onions so that consumers can easily use onions containing a large amount of quercetin without any resistance.

SUMMARY

The present invention is directed to providing a method of manufacturing a laver-like processed food using onions (*Allium cepa* L.).

The present invention is also directed to providing a laver-like processed food using onions (*Allium cepa* L.) that is manufactured according to the method.

Technical Solution

To achieve the first objective, the present invention provides a method of manufacturing a laver-like processed food using onions (*Allium cepa* L.), the method including: (1) freezing peeled onions; (2) thawing the onions, and then placing the onions in a compression grinder and grinding the onions; and (3) molding a mixture, which is obtained by mixing water with a ground onion product obtained in step (2), into sheets and then drying the sheets.

According to one embodiment of the present invention, in step (1), the onions may be frozen while immersed in a salt water solution of 0.2 to 2.0% (w/w).

According to one embodiment of the present invention, an average diameter of the onions ground in step (2) may range from 1 to 4 mm.

According to one embodiment of the present invention, the mixture of step (3) may be obtained by mixing the ground onion product and the water at a weight ratio ranging from 1:2 to 1:6.

According to one embodiment of the present invention, the mixture of step (3) may further include an onion skin extract at 1 to 5 parts by weight based on 100 parts by weight of the ground onion product.

According to one embodiment of the present invention, the mixture of step (3) may further include a ground product of a vegetable, a fruit, or a seaweed at 1 to 30 parts by weight based on 100 parts by weight of the ground onion product.

According to one embodiment of the present invention, the vegetable may be one or more selected from spinach, a napa cabbage core, napa cabbage, a tomato, red cabbage, a purple sweet potato, a sweet pumpkin, a bell pepper, and a carrot, the fruit may be one or more selected from a mango, a watermelon, and a banana, and the seaweed may be one or more selected from laver, sea mustard, kelp, and hijiki.

According to one embodiment of the present invention, the drying in step (3) may be performed at 80 to 120° C. for 15 to 60 minutes.

According to one embodiment of the present invention, after the drying, secondary drying may be additionally performed at 50 to 70° C. for 1 to 20 minutes.

According to one embodiment of the present invention, the laver-like processed food may be dried laver.

According to one embodiment of the present invention, the method may further include grinding and seasoning the laver-like processed food dried through step (3) to manufacture the laver-like processed food into a furikake-like food or a seasoned laver-like food.

To achieve the second objective, the present invention provides a laver-like processed food using onions (*Allium cepa* L.) that is manufactured according to the method.

According to a method of the present invention, after onions (*Allium cepa* L.) are molded into sheets and dried, the onion sheets are prevented from sticking to a pallet or a laver mat for drying and being damaged when the onion sheets are separated from the pallet or the laver mat, and in this way, a laver-like processed food that is thin and springy can be mass-produced without wasting raw ingredients.

The laver-like processed food manufactured according to the method of the present invention has wide appeal and creates added value because palatability is high due to removing a characteristic spicy taste and smell and increasing an inherent flavor and a natural sweet taste of onions, useful components such as quercetin are contained in large amounts, and preservability is improved. Also, despite being manufactured with onions, which are a vegetable, as its main ingredient, the laver-like processed food of the present invention significantly reduces the characteristic rough texture of the vegetable, has soft texture similar to that of laver used for gimbap, and has excellent springiness. In addition, due to being highly soluble and easily dissolving in saliva when put in the mouth, the laver-like processed food of the present invention hardly causes any foreign body sensation. Accordingly, the laver-like processed food using onions of the present invention can replace gimbap laver or seasoned laver and thus is very useful.

DETAILED DESCRIPTION OF THE INVENTION

Figure 1:
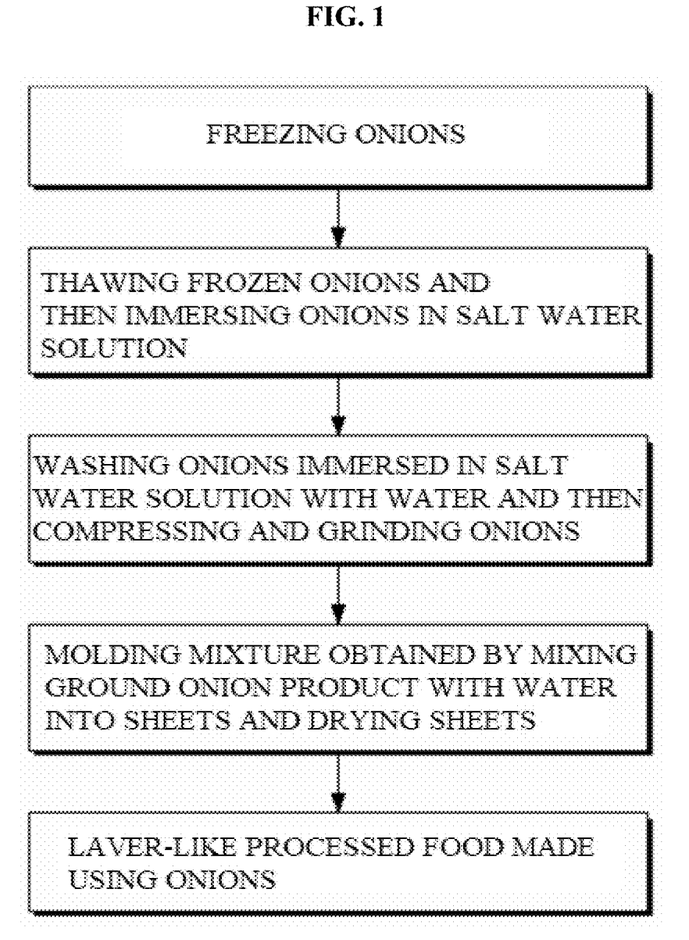
FIG. 1 is a flowchart illustrating a method of manufacturing a laver-like processed food using onions (*Allium cepa* L.) according to the present invention.
Figure 2A:
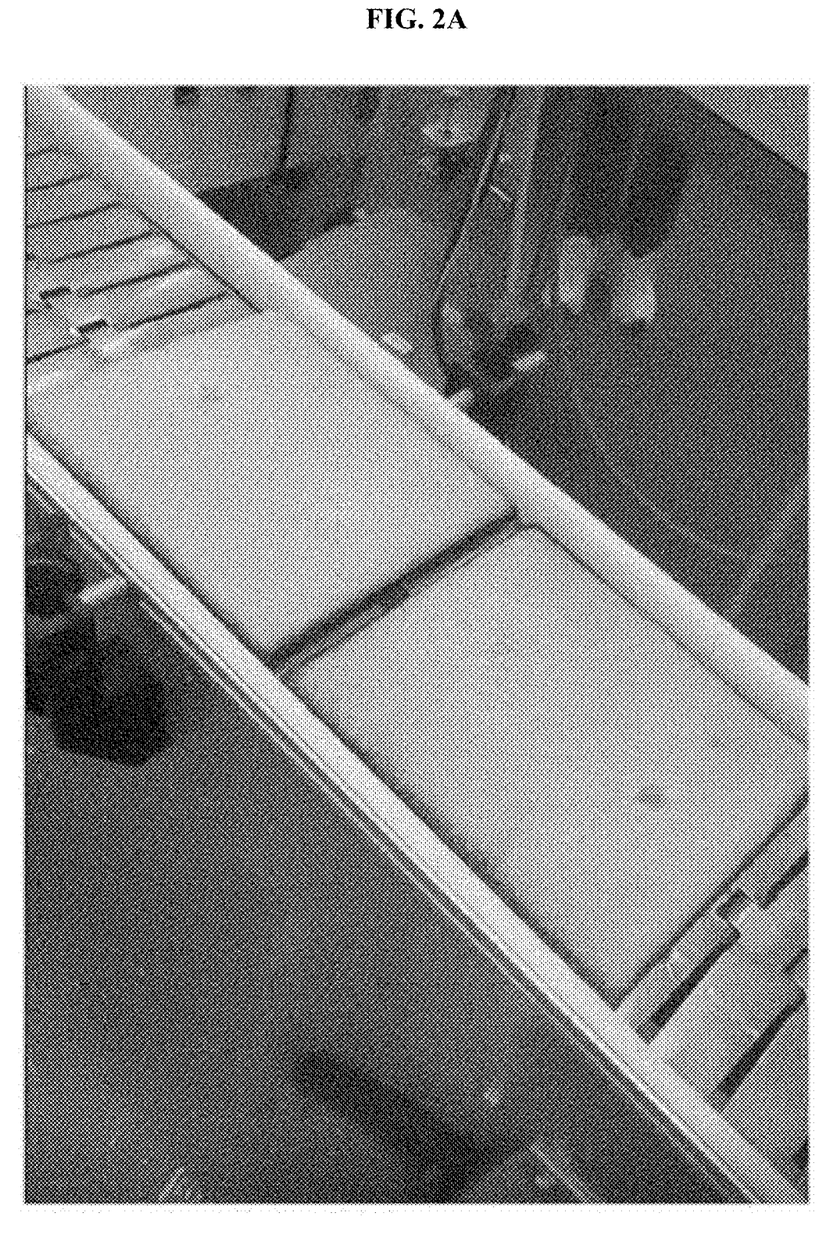
FIGS. 2A and 2B are pictures showing states of molding ground onion products and then conveying the ground onion products to a drying apparatus according to one embodiment of the present invention.
Figure 2B:
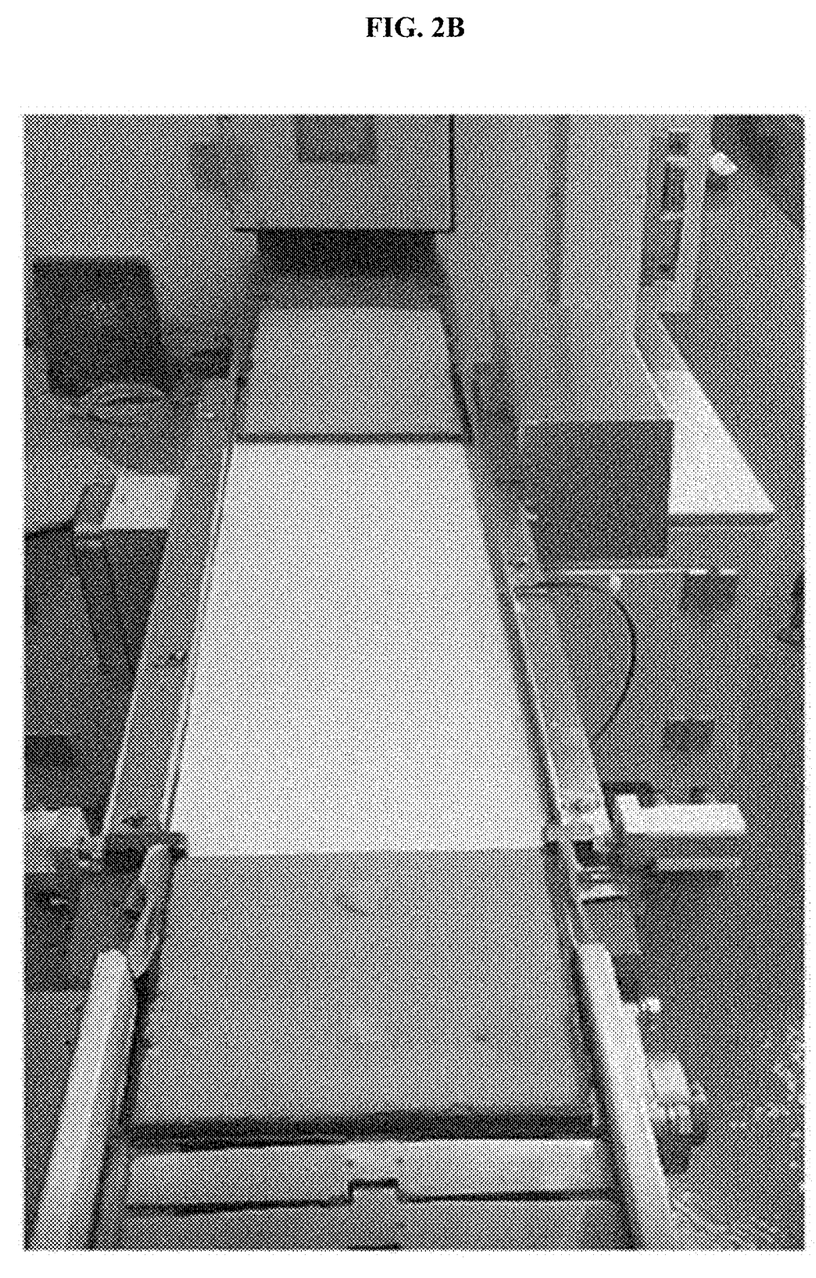
Figure 3A:
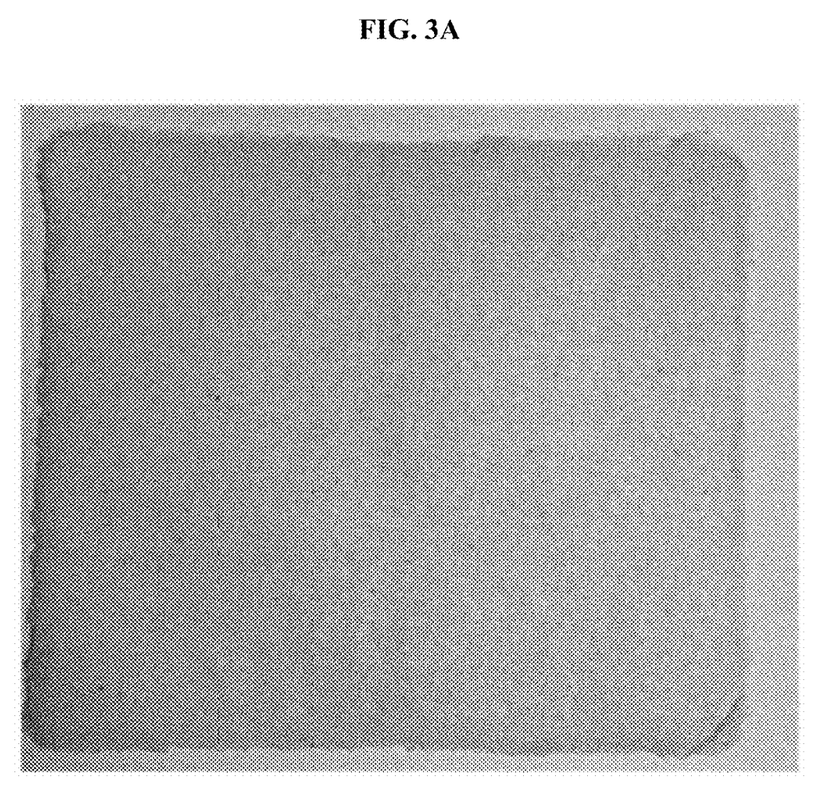
FIG. 3A is a picture showing the appearance of a laver-like processed food using onions (*Allium cepa* L.) according to Example 1 of the present invention.
Figure 3B:
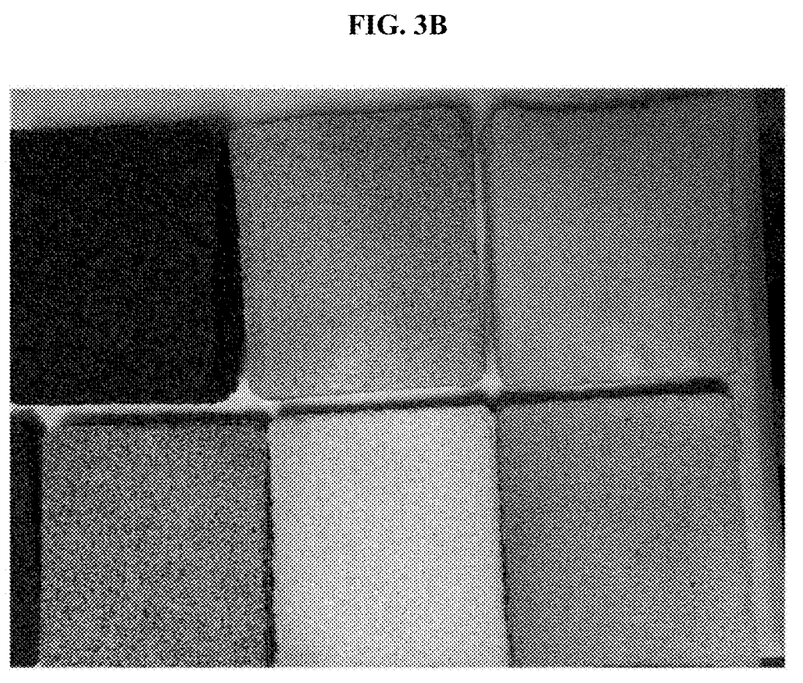
FIG. 3B is a picture showing the appearance of a laver-like processed food using onions (*Allium cepa* L.) and various other vegetables or seaweeds according to Example 2 of the present invention.

Hereinafter, several aspects and various embodiments of the present invention will be described in more detail.

One aspect of the present invention relates to a method of manufacturing a laver-like processed food using onions (*Allium cepa* L.), the method including: (1) freezing peeled onions; (2) thawing the onions, and then placing the onions in a compression grinder and grinding the onions; and (3) molding a mixture, which is obtained by mixing water with the ground onion product obtained in step (2), into sheets and then drying the sheets.

Step (1) is a step of freezing peeled onions.

Preferably, the onions may be frozen after being diced, and preferably, the diced onions may have an average diameter ranging from 5 to 20 mm.

Also, preferably, the onions may be frozen while immersed in a salt water solution of 0.1 to 3.0% (w/w), preferably of 0.2 to 2.0% (w/w), more preferably of 0.3 to 1.5 (w/w), and even more preferably of 0.5 to 1.0% (w/w).

When the onions are frozen while immersed in a salt water solution as described above and then thawed, due to osmotic pressure, sugar and allyl sulfide compounds contained in the onions are discharged together with moisture, and thus the characteristic spicy taste and smell of the onions are significantly removed, and the flesh of the onions becomes softer. When the concentration of the salt water solution in which the onions are immersed is below the above-mentioned lower limit, the characteristic spicy taste and smell of the onions are not sufficiently removed, and when the concentration exceeds the above-mentioned upper limit, an inherent flavor of the onions decreases, and a salty taste becomes stronger, and thus the sensory characteristics are degraded.

Also, preferably, the onions may be frozen for 2 days or more, preferably for 2 to 7 days, and more preferably for 3 to 5 days.

When the onions are frozen in this way and then thawed, since a certain amount of the sugar contained in the onions is removed, after the onions are molded into sheets and dried, it becomes easy to separate the onion sheets from a pallet or a laver mat for drying. When the steps of freezing and thawing the onions are not performed, after the onions are molded into sheets and dried, the onion sheets stick to the pallet or the laver mat for drying and are damaged when the onion sheets are separated from the pallet or the laver mat, and furthermore, since a bitter taste becomes stronger, the sensory characteristics are degraded.

Step (2) is a step of thawing the frozen onions, and then placing the onions in a compression grinder and grinding the onions.

The compression grinder is not particularly limited as long as the compression grinder can perform compression and grinding. A specific example of the compression grinder may be a screw-type compression grinder that has one or more punching plates.

The compressed and ground onions may have an average diameter ranging from 1 to 4 mm, preferably from 1 to 3 mm, and more preferably from 1 to 2 mm. Also, the onions have moisture content of 90% (w/w) or higher, but as the onions are compressed and ground, the moisture escapes from the onions, and the moisture content becomes less than 20% (w/w), preferably less than 15% (w/w), and since the size of fibers decreases, it becomes easy to perform molding.

When the average diameter of the onions is less than the lower limit, in the process of molding the ground onion product, the onions may slip through the pallet or the laver mat for drying, loss of raw ingredients may occur, yield may decrease, and it becomes difficult to perform processing. Also, when the average diameter of the onions exceeds the upper limit, not only is it difficult to mold the onions into sheets of uniform shapes and/or thicknesses, but it is also difficult to mold the onions into sheets of small thicknesses when processing the onions into a laver-like form, and thus the springiness and texture of the final product become inferior. When the onions are ground to have an average diameter in the above range, loss of raw ingredients is minimized in the process of manufacturing a processed food, the onions can be molded into sheets of uniform shapes and/or thicknesses, and in particular, it becomes easy to mold the onions into sheets of small thicknesses when processing the onions into a laver-like form. Also, when the onions are ground to have an average diameter in the above range, since the sugar or the like contained in the onions makes the onions have coherence by themselves, additives such as starch added for molding a processed food becomes unnecessary.

Step (3) is a step of molding a mixture, which is obtained by mixing water with the ground onion product obtained in step (2), into sheets and then drying the sheets.

The mixture of step (3) may be obtained by mixing the ground onion product and the water at a weight ratio ranging from 1:2 to 1:6, preferably from 1:3 to 1:5.

When the water is mixed with the compressed ground product of the onions at the above weight ratio, it becomes easy to mold the onions into thin sheets. When the content of water mixed with the ground onion product is below the lower limit, it becomes difficult to mold the mixture into thin sheets, and when the content of water mixed with the ground onion product exceeds the upper limit, coherence of the mixture weakens, which makes it difficult to maintain the shape after drying, or even when the shape is maintained, the sheets become prone to breakage.

Also, the mixture may further include an onion skin extract at 1 to 5 parts by weight, preferably at 2 to 4 parts by weight, based on 100 parts by weight of the ground onion product.

When the onion skin extract is included at the above weight ratio in the mixture, the preservability of a processed food significantly increases, and there is also an excellent effect on sensory characteristics. Above all, when the onion skin extract is further included as described above, the content of flavonoids such as quercetin increases. When the weight ratio of the onion skin extract with respect to the ground onion product is below the lower limit, an effect of increasing the preservability of a processed food is insignificant, and when the weight ratio of the onion skin extract with respect to the ground onion product exceeds the upper limit, coherence of the mixture including the ground onion product may decrease, and thus it may be difficult to maintain the shape of the final product, and the sensory characteristics of the processed food may actually be degraded.

The onion skin extract may be prepared by mixing onion skin with water at a weight ratio ranging from 1:10 to 1:30, preferably from 1:15 to 1:25, and more preferably from 1:18 to 1:22, performing extraction at a temperature ranging from 65 to 95° C., preferably from 70 to 90° C., and more preferably from 75 to 85° C., for 0.5 to 10 hours, preferably for 1 to 5 hours, and then performing vacuum evaporation. When the weight ratio of the onion skin and water deviates from the above range, an effective component of the onion skin may be extracted in a small amount in the extract.

The "extract" includes not only a crude extract obtained by hot water extraction of the onion skin but also includes a processed product of the onion skin extract. For example, the onion skin extract may be prepared in a powder form by an additional process such as freeze-drying or spray-drying. Preferably, the onion skin extract included in the mixture of the present invention may be in the form of a powder obtained by freeze-drying a hot water extract of onion skin.

Also, the mixture may further include a ground product of a vegetable, a fruit, or a seaweed at 1 to 30 parts by weight, preferably at 1 to 10 parts by weight, and more preferably at 3 to 10 parts by weight, based on 100 parts by weight of the ground onion product.

The type of vegetable, fruit, or seaweed that may be included in the mixture is not particularly limited as long as the texture of the dietary fiber is not extremely tough enough to harm the texture of the final product.

As a specific example, the vegetable may be one or more selected from spinach, a napa cabbage core, napa cabbage, a tomato, red cabbage, a bell pepper, and a carrot, the fruit may be one or more selected from a mango, a watermelon, and a banana, and the seaweed may be one or more selected from laver, sea mustard, kelp, and hijiki.

When the weight ratio of the ground product of the vegetable, fruit, or seaweed with respect to the ground onion product is within the above range, various colors and/or flavors can be implemented while maintaining the soft texture of the product as much as possible. When the weight ratio of the ground product of the vegetable, fruit, or seaweed with respect to the ground onion product is below the lower limit, an effect due to adding the ground product of the vegetable, fruit, or seaweed is insignificant, and when the weight ratio of the ground product of the vegetable, fruit, or seaweed with respect to the ground onion product exceeds the upper limit, solubility of the product may decrease, or the texture may become rough and cause a decrease in palatability.

Also, in the present invention, after the mixture including the ground onion product is molded into thin sheets, that is, into a laver-like form, a process of irradiating the sheets with far infrared rays and/or a process of drying the sheets with a hybrid dryer may be performed. When the far infrared radiation and the drying with the hybrid dryer are also performed, since the content of quercetin contained in the molded mixture increases, bacteria and mold that may be in the mixture are killed, and the molded mixture is uniformly and rapidly dried, it is preferable in terms of productivity and marketability.

The far infrared radiation may be performed by emitting far infrared rays having a wavelength ranging from 1 to 100 μm, preferably from 2 to 50 μm, and more preferably from 2 to 14 μm, for 10 to 100 minutes, preferably 20 to 40 minutes, using a far infrared lamp. When the far infrared rays have a wavelength in the above range, the content of quercetin contained in the mixture may be increased by at least 5% or more, preferably by 10% or more, and more preferably by 10 to 30%, while uniformly drying the molded mixture. When the far infrared rays have a wavelength below the lower limit, the content of quercetin contained in the mixture may actually decrease, and when the far infrared rays have a wavelength that exceeds the upper limit, the effect of increasing the content of quercetin by far infrared radiation may be insignificant.

The drying with the hybrid dryer may be performed at a temperature ranging from 80 to 120° C., which is significantly higher than a temperature ranging from 40 to 45° C. which is a typical laver manufacturing temperature, for 15 to 60 minutes, preferably for 20 to 50 minutes, and more preferably for 30 to 40 minutes. When the drying temperature or time is below the lower limit, an excessive amount of time may be required for drying, and when the drying temperature or time exceeds the upper limit, wrinkles or cracks develop in the laver-like form and make the shape unfavorable, and a bitter taste is generated and decreases palatability.

Also, after the drying with the hybrid dryer, secondary drying may be additionally performed at 50 to 70° C., preferably at 50 to 60° C., and more preferably at 50 to 55° C., for 1 to 20 minutes, preferably for 5 to 12 minutes. When the secondary drying is performed under the above conditions, the content of moisture in the product can be minimized while minimizing damage to the product quality.

The laver-like processed food using onions of the present invention may be dried onion laver, and preferably, the dried onion laver manufactured according to the present invention may have a thickness ranging from 0.2 to 0.5 mm on average because in such a thickness range, the onion laver has constant springiness and is easily bent while not breaking easily and has favorable texture, and the drying time can be shortened. The dried onion laver may be cut into quadrangular shapes of certain sizes to make it easier for consumers to eat.

In the present specification, the term "dried onion laver" refers to the laver-like processed food manufactured using onions of the present invention.

Also, the method may further include grinding and seasoning the laver-like processed food dried through step (3) to manufacture the laver-like processed food into a furikake-like food or a seasoned laver-like food.

According to one aspect of the present invention, the present invention relates to a laver-like processed food using onions that is manufactured according to the method. The laver-like processed food using onions may be dried onion laver.

Despite being manufactured with onions, which are a vegetable, as its main ingredient, the laver-like processed food of the present invention significantly reduces the characteristic rough texture of the vegetable, has soft texture similar to that of laver used for gimbap, and has excellent springiness. In addition, due to being highly soluble and easily dissolving in saliva when put in the mouth, the laver-like processed food of the present invention hardly causes any foreign body sensation. Also, accordingly, the laver-like processed food using onions of the present invention can replace gimbap laver or seasoned laver and thus is very useful.

In addition, the experimental results presented below describe only the representative experimental results of the examples and comparative examples, and the effects of each embodiment of the present invention that are not explicitly presented below will be described in detail in the corresponding section.

EXAMPLES

Example 1: Manufacture of Dried Onion Laver (1) Peeled onions were diced to have an average diameter of about 2 cm, immersed in a salt water solution of 0.6% (w/w) at about 4° C., placed in a freezer, and frozen for 3 days.

(2) The frozen onions were naturally thawed, washed twice with clean water, placed in a compression grinder, and ground to have an average diameter of 1.5 mm.

(3) A mixture obtained by mixing the ground onion product obtained in step (2) with water at a weight ratio of 1:4 was placed in a stirring tank provided at a laver molding machine, sprayed onto a pallet (laver mat) through a supply nozzle connected to the stirring tank, and formed into rectangular onion sheets.

(4) The pallet (laver mat) on which the onion sheets were formed was conveyed to a hybrid dryer through a conveyor, dried at 120° C. for 15 minutes and at 90° C. for 10 minutes, and then secondarily dried at 60° C. for 15 minutes.

(5) The dried pallet (laver mat) was conveyed to an automatic peeling apparatus through a conveyor and then separated to manufacture dried onion laver.

Example 2: Addition of Napa Cabbage Cores (Onion: Napa Cabbage Cores=100:10)

Dried onion laver was manufactured in the same manner as in Example 1 except that a ground product of napa cabbage cores was added at 10 parts by weight based on 100 parts by weight of the ground onion product to the mixture of step (3) and mixed therewith.

Example 3: Addition of Onion Skin Extract

Dried onion laver was manufactured in the same manner as in Example 1 except that an onion skin extract was added at 3 parts by weight based on 100 parts by weight of the ground onion product to the mixture of step (3) and mixed therewith.

The onion skin extract was prepared by mixing onion skin, which was thoroughly washed and sufficiently dried, with water at a weight ratio of 1:20, performing extraction at 80° C. for 2 hours, performing filtration and vacuum evaporation, and then performing freeze-drying to prepare the onion skin extract in a powder form.

Example 4: Addition of Far Infrared Radiation Process

Dried onion laver was manufactured in the same manner as in Example 1 except that, in step (4), before the pallet (laver mat) on which the onion sheets were formed was moved to the hybrid dryer through the conveyor, the pallet (laver mat) was irradiated with far infrared rays having a wavelength of 10 μm for 30 minutes using a far infrared lamp.

Comparative Example 1: Omission of Freezing and Thawing Processes

Dried onion laver was manufactured in the same manner as in Example 1 except that step (1) was omitted.

Comparative Example 2: Omission of Immersion in Salt Water Solution

Dried onion laver was manufactured in the same manner as in Example 1 except that, in step (1), immersion in the salt water solution was omitted.

Comparative Example 3: Use of Napa Cabbage Cores Instead of Onions

The method of Example 1 was used except that, instead of onions, napa cabbage cores were used to manufacture dried napa cabbage core laver.

Experimental Examples

Measurements were repeated three times in all experiments, and all result values are shown in the form of "average±standard deviation." SPSS software (ver. 20.0, SPSS Inc., Chicago, IL, USA) was used for statistical analysis. A one-way ANOVA was performed to verify a difference of each average value, and when p<0.05, it was determined as significant. In the data, *, , and * mean that there is a significant difference at p<0.05, p<0.01, and p<0.001, respectively, (student's t-test) as compared to Comparative Example 1.

Experimental Example 1: Production Yield and Defect Rate 10 kg of each mixture in step (4) according to the examples and comparative examples was used to manufacture dried laver, and then the production yield (%) and defect rate (%) relative to the weight of raw ingredients were measured and are shown in Table 1 below. In Table 1 below, a case in which the manufactured dried onion laver was torn, a case in which a hole was formed in the manufactured dried onion laver, or a case in which the thickness of the manufactured dried onion laver was significantly not uniform were determined as defective.

TABLE 1

| Classification | Production yield (%) | Defect rate (%) |
| --- | --- | --- |
| Example 1 | 6.87 ± 0.15** | 11.3 ± 5.4*** |
| Example 2 | 7.16 ± 0.24** | 15.1 ± 7.3*** |
| Example 3 | 7.08 ± 0.31** | 12.4 ± 4.6*** |
| Example 4 | 6.76 ± 0.13** | 13.2 ± 6.1*** |
| Comparative Example 1 | 2.14 ± 0.11 | 61.2 ± 3.7 |
| Comparative Example 2 | 5.64 ± 0.08* | 24.4 ± 4.9** |

From Table 1 above, it can be confirmed that the dried onion laver according to the examples of the present invention had a significantly high production yield and a significantly low defect rate compared to the dried onion laver according to the comparative examples.

Experimental Example 2: Evaluation of Springiness

In order to check the springiness of the dried laver according to the examples and comparative examples, one end of each sample was held and fixed, and then the other end was gradually moved to measure an angle at which the sample was bent and broken, and results thereof are shown in Table 2 below.

TABLE 2

| Classification | Angle (°) |
| --- | --- |
| Example 1 | 440.7 ± 35.2*** |
| Example 2 | 400.3 ± 40.5*** |
| Comparative Example 1 | 160.5 ± 20.4 |
| Comparative Example 2 | 420.5 ± 30.6*** |
| Comparative Example 3 | 305.6 ± 30.4** |

From Table 2 above, it can be confirmed that the dried onion laver according to the examples of the present invention had significantly higher springiness than the dried onion laver according to the comparative examples.

Experimental Example 3: Solubility 100 g of 35° C. water was poured into a transparent container, 5 g of the dried laver according to each of the examples and comparative examples was added to the container, the container was closed with a cap and placed on a vertical vibrating sieve, and then the time until the dried laver completely lost its shape under conditions including 170 rpm and a vertical vibration width of 7 cm was measured. The measurement results are shown in Table 3 below.

TABLE 3

| Classification | Time taken for laver to lose its shape (seconds) |
| --- | --- |
| Example 1 | 10.3 ± 1.2** |
| Example 2 | 16.2 ± 1.1* |
| Example 3 | 8.6 ± 0.6** |
| Comparative Example 1 | 23.6 ± 3.7 |
| Comparative Example 2 | 13.2 ± 0.9** |
| Comparative Example 3 | 45.3 ± 2.7** |

From Table 3 above, it can be confirmed that the dried onion laver according to the examples of the present invention had significantly higher solubility than the dried onion laver according to the comparative examples.

Such a result indicates that a foreign body sensation in the mouth is less when the dried onion laver of the present invention is put in the mouth because the dried onion laver of the present invention easily dissolves in saliva.

Experimental Example 4: Quercetin Content

Water (HPLC grade, JT Baker, USA) and acetonitrile (HPLC grade, JT Baker) were used for analytic reagents, and a quercetin compound was used for standard products.

Ultimate 3000 series (Thermo, USA) was used as a high-performance liquid chromatography ultraviolet detector (HPLC-UVD).

About 2 g of the dried onion laver according to each of the examples and comparative examples was placed in a flask having a volume of 50 ml, the flask was filled with distilled water up to a gauge mark, and then the dried onion laver according to each of the examples and comparative examples was completely dissolved and filtered with a syringe filter (0.45 µm).

High performance liquid chromatography (HPLC) analysis was performed for quercetin content. Capcell pak C18 column (Shiseido, 5 µm, 250×4.6 mm) was used as a column, and acetonitrile and water were used for a mobile phase. Measurement was performed under mobile phase conditions shown in Table 4 below while the amount of injected sample was 10 µl, the flow speed was 1.0 ml/minute, the temperature was 30° C., and the UV detector was 203 nm.

TABLE 4

| Time (minutes) | A: water | B: acetonitrile |
| --- | --- | --- |
| 0 | 80 | 20 |
| 5 | 80 | 20 |
| 20 | 77 | 23 |
| 25 | 70 | 30 |
| 30 | 60 | 40 |
| 35 | 50 | 50 |
| 60 | 15 | 85 |
| 65 | 15 | 85 |
| 66 | 80 | 20 |
| 75 | 80 | 20 |

The quantitative value of each sample was calculated by the following calculation formula after substituting the peak area of a measurement value in the calibration curve (y=ax+b) equation and is shown in Table 5 below. Also, the calibration curve was calculated using the least square technique by applying concentration to the x-axis and peak area to the y-axis.

Quantitative value (mg/g) = $C \times (a \times b)/S \times 1/1{,}000$ (C: quercetin content (μg/ml) in test solution
a: entire quantity of test solution (ml), b: dilution-to-threshold ratio
S: quantity of collected sample (g), 1/1,000: unit conversion factor)

TABLE 5

| Classification | Quercetin content (mg/g) |
| --- | --- |
| Example 1 | 0.24 ± 0.02 |
| Example 2 | 0.18 ± 0.02 |
| Example 3 | 0.26 ± 0.03* |
| Example 4 | 0.62 ± 0.02*** |
| Comparative Example 1 | 0.21 ± 0.01 |
| Comparative Example 2 | 0.22 ± 0.02 |

From Table 5 above, it can be confirmed that the dried onion laver of Example 4 that was manufactured by also performing far infrared radiation in the drying process had significantly higher quercetin content than the dried onion laver manufactured using other methods.

Experimental Example 5: Evaluation of Safety of Effective Component

While storing the dried laver according to each of the examples and comparative examples for 30 days under conditions including a temperature of 40° C. and a relative humidity of 70%, the quercetin content was measured, and the content of the effective component according to a storage period was calculated as a relative ratio to the content of the effective component on an initial storage day (Day 0, right after manufacture) and is shown in Table 6 below.

TABLE 6

| Classification | Quercetin content (% right after manufacture) |
| --- | --- |
| Example 1 | 84.2 ± 8.7 |
| Example 2 | 76.4 ± 5.9 |
| Example 3 | 98.8 ± 1.1** |
| Example 4 | 86.1 ± 9.4 |
| Comparative Example 1 | 81.6 ± 6.7 |
| Comparative Example 2 | 84.3 ± 10.1 |

From Table 6, it can be confirmed that a decrease in quercetin content according to an elapse of the storage period in a high-temperature, high-humidity environment was significantly less in the dried onion laver of Example 3 that was manufactured by adding an onion skin extract in the manufacturing process, compared to the dried onion laver manufactured using other methods.

Experimental Example 6: Sensory Evaluation

A sensory evaluation was performed for the dried laver according to each of the examples and comparative examples.

Specifically, a panel of 50 men and 50 women with 3 or more years of experience in sensory testing in the food-related field was formed, a palatability test was conducted based on a 9-point scale (minimum 1 point, maximum 9 points), and here, SPSS 12.0 statistics program was used for statistical processing, and significance was verified at a significance level of $p<0.05$ by the Duncan multiple range test (DMR-test). The evaluation results are shown in Table 8 below.

TABLE 8

| Classification | Taste | Smell | Texture | Overall palatability |
| --- | --- | --- | --- | --- |
| Example 1 | 7.0 | 6.8 | 7.0 | 6.9 |
| Example 2 | 7.2 | 7.0 | 6.8 | 7.0 |
| Example 3 | 7.5 | 7.2 | 7.0 | 7.2 |
| Example 4 | 7.0 | 7.2 | 7.0 | 7.1 |
| Comparative Example 1 | 4.3 | 4.0 | 3.0 | 3.8 |
| Comparative Example 2 | 4.5 | 4.5 | 6.5 | 5.2 |
| Comparative Example 3 | 5.4 | 6.0 | 2.5 | 4.6 |

From Table 8 above, it can be confirmed that the overall palatability was higher in the dried onion laver of the examples compared to the dried onion laver of the comparative examples.

Meanwhile, in the case of Comparative Example 2 in which the dried onion laver was manufactured while omitting the immersion in a salt water solution, the palatability was low because the characteristic pungent taste and smell of onions were not reduced, and in the case of Comparative Example 3 in which the dried laver was manufactured using napa cabbage cores instead of onions, the palatability was very low due to unfavorable texture.

Exemplary embodiments of the present invention that are illustrated in the drawings have been described above, but the present invention is not limited to the specific exemplary embodiments described above, and those of ordinary skill in the art to which the invention pertains may make various modifications without departing from the gist of the present invention claimed in the claims, and such changes also belong to the scope of the claims.

The invention claimed is:

1. A method of manufacturing a processed food in sheet form using onions (*Allium cepa* L.), the method comprising:
    (1) freezing peeled onions and thawing the onions to remove sugar from the onions;
    (2) placing the onions in a compression grinder and grinding the onions;
    (3) mixing 200 to 600 parts by weight of water with 100 parts by weight of a ground onion product obtained from step (2) or mixing 1 to 10 parts by weight of a vegetable, a fruit, or a seaweed and 200 to 600 parts b weight of water with 100 parts by weight of the ground onion product and then forming a mixture, which is obtained by mixing the water with the ground onion product, into sheets;
    (4) irradiating far-infrared rays with a wavelength of 2 to 50 μm to the sheet-shaped mixture for 20 to 40 minutes before drying the sheet-shaped mixture;
    (5) primarily drying the sheet-shaped mixture irradiated with the far-infrared rays at 90 to 120° C. for 15 to 60 minutes; and
    (6) secondarily drying the sheet-shaped mixture at 50 to 70° C. for 1 to 20 minutes.

2. The method of claim 1, wherein, in step (1), the onions are frozen while immersed in a salt water solution of 0.2 to 2.0% (w/w).

3. The method of claim 1, wherein an average diameter of the onions ground in step (2) ranges from 1 to 4 mm.

4. The method of claim 1, wherein the mixture of step (3) further includes an onion skin extract at 1 to 5 parts by weight based on 100 parts by weight of the ground onion product.

5. The method of claim 1, wherein:
- the vegetable is one or more selected from spinach, a napa cabbage core, napa cabbage, a tomato, red cabbage, a purple sweet potato, a sweet pumpkin, a bell pepper, and a carrot;
- the fruit is one or more selected from a mango, a watermelon, and a banana; and
- the seaweed is one or more selected from laver, sea mustard, kelp, and hijiki.

6. The method of claim 1, wherein the processed food is dried onion sheet.

7. The method of claim 1, further comprising grinding and seasoning the processed food after the step (6).

* * * * *